US012668021B2

(12) United States Patent
Neuefeind

(10) Patent No.: US 12,668,021 B2
(45) Date of Patent: Jun. 30, 2026

(54) APPARATUS AND METHOD FOR PRODUCING FLEXOGRAPHIC PRINTING FORMS

(71) Applicant: Neuefeind GmbH, Ochtendung (DE)

(72) Inventor: Sven Neuefeind, Ochtendung (DE)

(73) Assignee: NEUEFEIND GMBH, Ochtendung (DE)

( * ) Notice: Subject to any disclaimer, the term of this patent is extended or adjusted under 35 U.S.C. 154(b) by 244 days.

(21) Appl. No.: 18/641,222

(22) Filed: Apr. 19, 2024

(65) Prior Publication Data

US 2024/0383191 A1    Nov. 21, 2024

(30) Foreign Application Priority Data

May 16, 2023    (DE) ..................... 10 2023 112 826.4

(51) Int. Cl.
| | |
|---|---|
| *B29C 64/129* | (2017.01) |
| *B29C 64/245* | (2017.01) |
| *B29C 64/264* | (2017.01) |
| *B33Y 10/00* | (2015.01) |
| *B33Y 30/00* | (2015.01) |
| *B33Y 80/00* | (2015.01) |
| *B41C 1/18* | (2006.01) |
| *B29L 31/00* | (2006.01) |

(52) U.S. Cl.
CPC .......... *B29C 64/129* (2017.08); *B29C 64/245* (2017.08); *B29C 64/264* (2017.08); *B33Y 10/00* (2014.12); *B33Y 30/00* (2014.12); *B33Y 80/00* (2014.12); *B41C 1/18* (2013.01); *B29L 2031/767* (2013.01)

(58) Field of Classification Search
CPC ... B29C 64/124; B29C 64/129; B29C 64/264; B29C 64/268; B29C 64/273; B29C 64/277; B29C 64/282; B29C 64/286; B29C 64/291; B33Y 10/00; B33Y 30/00; B33Y 50/02; G03F 7/0037; G03F 7/2012; G03F 7/70416; B41C 1/18
See application file for complete search history.

(56) References Cited

U.S. PATENT DOCUMENTS

| | | | |
|---|---|---|---|
| 2018/0290386 A1* | 10/2018 | DeCiccio | .............. B29C 64/393 |
| 2018/0304609 A1 | 10/2018 | Telser et al. | ............. B41C 1/00 |
| 2018/0361773 A1* | 12/2018 | Billiet | ................... B33Y 30/00 |
| 2021/0299942 A1 | 9/2021 | Sievers | ................ B29C 64/112 |

FOREIGN PATENT DOCUMENTS

| | | | | |
|---|---|---|---|---|
| DE | 102005054000 | | 6/2006 | .............. G03F 7/20 |
| DE | 102005054000 A1 * | | 6/2006 | .......... G03F 7/2057 |
| WO | WO 2017068125 | | 4/2017 | .............. G03F 7/00 |

* cited by examiner

*Primary Examiner* — JaMel M Nelson
(74) *Attorney, Agent, or Firm* — HAYES SOLOWAY P.C.

(57) ABSTRACT

Disclosed are an apparatus and a method for the production of printing forms for flexographic printing. The apparatus includes a carrier plate on a retaining device, a reservoir and an exposure apparatus. A solidifiable medium is applied to a carrier plate in regions or at certain points in at least one layer in order to configure a raised surface of the printing form. At least one exposure apparatus emits UV radiation, points which are exposed to this radiation. By the sequence of exposure over a defined time and subsequent movement of the carrier plate, preferably in the vertical direction to the exposure apparatus, the solidifiable medium is solidified layer by layer. Thus a raised printing form is produced by repetition of this sequence.

17 Claims, 7 Drawing Sheets

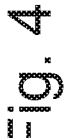
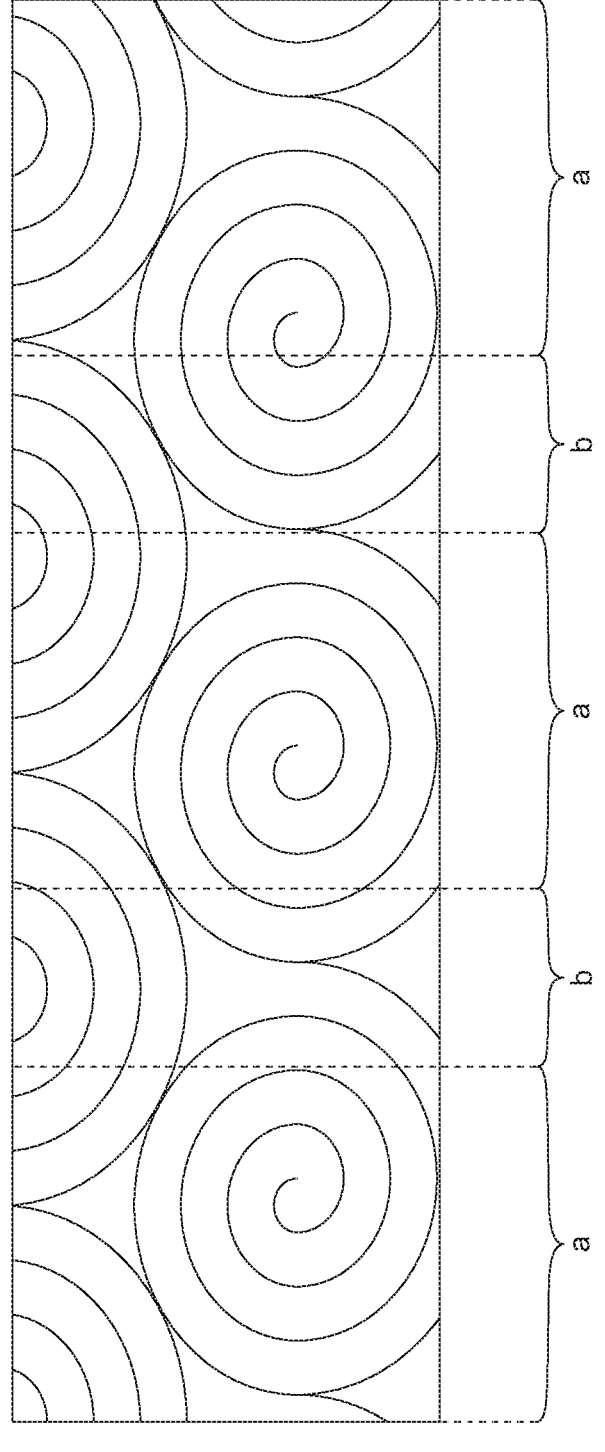

APPARATUS AND METHOD FOR PRODUCING FLEXOGRAPHIC PRINTING FORMS

BACKGROUND OF THE INVENTION

The present invention relates to an apparatus and a method for the production of printing forms for flexographic printing, comprising a carrier plate on a retaining device, a reservoir and an exposure apparatus. In this case a solidifiable medium is applied to a carrier plate in regions or at certain points in at least one layer in order to configure a raised surface of the printing form. In this case, with at least one exposure apparatus which emits UV radiation, points which are exposed to this radiation are solidified. By the sequence of exposure over a defined time and subsequent movement of the carrier plate, preferably in the vertical direction with respect to the exposure apparatus, the solidifiable medium is solidified layer by layer. Thus a raised printing form is produced by repetition of this sequence.

A frequent field of application for flexographic printing forms is the printing of packaging. In this case the printing form is gripped on a roller by which a generally polar printing ink then applied to the material to be printed. In order for the printing forms which are usually produced in planar form to be fastened to rollers, it is essential that the printing form is soft and elastic. Moreover, the printing forms must be resistant to the water-based or solvent-based inks and UV inks used. Likewise, the printing form must be sufficiently resistant to wear during printing, which is produced by the printing form rolling on the material to be printed.

The commonly used manufacturing methods for such printing forms are subtractive methods, in which material is removed from a mat in order to produce shapes, patterns and/or reliefs. These methods comprise many necessary process steps and moreover are material-intensive, since the removed material cannot be further used. The blanks are usually mats, which according to the current state of the art have an upper UV-opaque layer which can be removed by a laser. The pattern/relief thus produced is then exposed with UV radiation. By this process step the material is solidified at the points which the UV light reaches. The points and regions which are covered by the UV-opaque layer remain soft and are not solidified. Naturally the UV-opaque layer can also be a type of film which is laid onto the base material.

Then the mat is washed. In this case the soft, non-solidified regions are washed out of the mat—and thus subtracted from the base mat. Only the points and surfaces exposed in the preceding process step remain raised on the mat. Since in this process step the cleaning fluid has taken up the dissolved unexposed material of the mat, here too there is an increased use of material because the washing liquid often has to be renewed. Then drying and finishing of the mat are necessary before it can be cut to size.

Thus the prior art shows a considerable outlay of material and time, since each individual process step usually also requires a different apparatus or machine. Moreover, there is also the additional potential source of errors in the gripping the mats on the respective apparatus or machine.

An additive method of manufacture is also known from WO 2017/068125. In this case a reactive liquid is applied to a carrier material by a type of printer. This takes place in a plurality of layers. Then an action time is required so that the reactive liquid can diffuse into the carrier material. Only then does a curing of the material take place by for example UV light.

Also the state of the art of this additive manufacturing method has various disadvantages since, on the one hand, by a multiple application of the reactive material without prior curing of the lower layer, blurring occurs the higher the raised locations and shapes turn out, whilst on the other hand the action time is obstructive for effective production. Thus especially for complex and small signs, such as QR codes or barcodes, which are currently used, there is a need for another type of production facility.

This gives rise to the requirement for a new apparatus and a new method for production of flexographic printing forms, which only requires a few production steps, is cost-effective and can also present complex shapes and structures on a printing plate precisely with high resolution.

SUMMARY OF THE INVENTION

The present invention relates to an apparatus and a method for the production of printing forms for flexographic printing. The apparatus comprises a carrier plate and a retaining device on which the carrier plate is arranged, a reservoir and an exposure apparatus. The reservoir can be filled with a solidifiable medium and the carrier plate can be inserted into this. The exposure apparatus can radiate UV radiation in patterns, images or other shapes onto the solidifiable medium, wherein the carrier plate and the exposure apparatus are so arranged that at least one layer of the solidifiable medium can be exposed between a main face of the carrier plate and the exposure device with UV radiation and as a result is deposited and solidified on the carrier plate. The carrier plate is adjustable in the reservoir and a layer thickness of the layer of solidifiable medium between the carrier plate and the exposure apparatus is adjustable by a relative movement of the carrier plate and the reservoir.

The carrier plate is preferably flat. Therefore the length and width of the carrier plate correspond to a multiple of its height. In this case the surfaces which result from length and width correspond to the main sides. The end faces correspond to the products of plate height and width or length.

The main side of the carrier plate on which layers of the solidifiable medium are deposited has a corresponding surface quality or roughness, so that the first layer of the solidifiable medium is adhered. After the application of the layers these are again releasable from the carrier plate without damaging the raised structure of layers of the solidifiable medium and/or the carrier plate.

The carrier plate is adjustable in the reservoir so that the thickness of the layer of solidifiable medium between carrier plate and the exposure apparatus is adjustable by a relative movement of the carrier plate and the reservoir. This relative movement can take place not only by a movement of the carrier plate, but alternatively by movement of the reservoir. Likewise a combined movement of the reservoir and the carrier plate is conceivable.

According to a preferred embodiment the exposure apparatus is arranged above or below the reservoir, wherein the reservoir has a UV-transparent reservoir base when the exposure apparatus is arranged below the reservoir. Through this UV-transparent reservoir base the exposure apparatus can radiate the UV radiation in patterns, images or other shapes in high resolution onto the base which is transparent therefor, wherein the UV rays pass through the UV-transparent base and strike the solidifiable medium between the carrier plate and the reservoir base. This medium is solidified in the regions in which it is exposed to the UV radiation. The medium is not solidified at points at which it is not exposed to any UV radiation due to patterns, images or other shapes of the exposure apparatus.

The distance of the carrier plate from the exposure apparatus is increased after an exposure time. As a result solidifiable medium flows between the exposure apparatus and the most recently deposited and solidified layer. By the sequence of exposure over a defined time and subsequent movement of the carrier plate, preferably in the vertical direction away from the exposure apparatus and the inflow of the medium, the solidifiable medium is solidified layer by layer. In this case due to the exposure with UV radiation a polymerisation of the exposed solidifiable medium takes place. The polymerisation is a chemical reaction in which molecules form with long chains which consist of a plurality of monomers and/or polymers bonded to one another. The UV radiation functions here as a catalyst. Thus by repetition of this sequence a raised structure is produced on the carrier plate by solidified polymers.

According to a further preferred embodiment the exposure apparatus consists of at least two projectors, which project an image in such a way that a contiguous image is produced by edge trimming and stacking of a plurality of images. Edge trimming is understood here to mean that the outer or boundary regions of at least two projected images are the same and thus can be projected in an overlap. By this overlap a contiguous image is produced without an edge being produced between the two projected images. The at least two images in boundary regions are stacked by this overlap.

In this way it is possible to join together a large contiguous image consisting of any number of individual images. This has the advantage that the resolution of the picture is designed so that a fine structure can be imaged. By comparison, when only one projector is used the resolution and thus also the degree of detail which can be imaged, is poorer, or the size of the image to be projected would be limited.

Also the distance of the exposure apparatus from the UV-transparent base can be kept small. This has advantages in the overall size of the apparatus. Thus it can have a more compact and space-saving configuration with improved resolution.

In another preferred embodiment the exposure apparatus has at least one display screen which emits UV radiation. Naturally, any other screen-like device and/or device transmitting UV radiation can also be used.

The exposure apparatus preferably emits UV-A radiation in a wavelength range from 300 nm to 410 nm, preferably 320 nm to 400 nm, particularly preferably 340 nm to 380 nm.

In a preferred embodiment the thickness of the layer of solidified medium is in a range from 0.01 mm to 3 mm, particularly preferably in a range from 0.02 mm to 2 mm, particularly preferably in a range from 0.025 mm to 1.5 mm. If the layer is too thick, the UV radiation only passes through the solidifiable medium to an unsatisfactory extent, so that no sufficient solidification occurs. If the spacing is insufficient, regions can be produced in which the medium cannot flow in because of its viscosity. Thus the layer structure would be disrupted.

In a preferred embodiment the layers can be deposited on the carrier plate in such a way that the raised structure has not only straight sides, but also any other type of shape and contour or relief. Thus raised structures in the form of a truncated cone, an inverted truncated cone, or also any type of concave and convex shape are possible. A side shape of this type is feasible, as the individual layers of solidified medium are exposed with slightly different images and patterns. Thus for production of a truncated cone a region which is exposed can be smaller from layer to layer. Also it is possible to provide an inverted truncated cone in which the exposed region becomes somewhat larger with every layer which is solidified. If particularly fine shapes of the sides must be provided, the thickness of the layers of solidifiable medium can be correspondingly decreased. The smaller the layer thickness, the finer the contour of the side surface can be. With the aid of the different side shapes the stability during the flexographic printing can be increased. Moreover it is possible to change the printing surface minimally by changing the force which the printing roller transmits to the flexographic printing plate during printing. Thus for example in the case of a truncated cone shape a slight enlargement of the printing surface can take place by increased pressure on the article to be printed. Also the side shape can be configured in such a way that during the production it has an inclination and/or shape which during gripping on the roller, and the bending of the raised structure associated therewith, produces a required shape.

In another preferred embodiment flat and also approximately round or rounded printing surfaces of the raised structure are feasible, and these can be both concave and also convex. In order to obtain a rounded printing surface, it may be advantageous to select the thickness of the layers of solidifiable medium to be thinner than in the case of building up less complex shaped layers. Here too, the printing surface of the raised structure can be configured in such a way that during the production it has a shape which during gripping on the roller, and the bending of the raised structure associated therewith, produces a required different shape for the flexographic printing. Thus during the production of the printing plate the raised structure can for example have a slightly concave curvature which is designed so that an exactly straight printing surface with sharp edges is produced by the gripping on a printing roller and the associated bending of the raised structure of the flexographic printing plate.

In a further preferred embodiment the required surface structure of the raised structure is deposited with the aid of the last layer or the last layers deposited. Thus for example notches, grooves, punctiform indentations or raised portions can be applied. This serves for a particularly advantageous takeup and dispensing of ink during flexographic printing.

According to a further preferred embodiment the retaining device can move the carrier plate with the aid of a moving device in the vertical and/or horizontal direction and can hold it in a defined position and/or can move the solidified raised structure of solidifiable medium on the carrier plate out of the reservoir.

The carrier plate may be oriented for example for a better release of the raised structure. In an advantageous embodiment the retaining device can be used in order to position the carrier plate exactly. Slight variations of the spacing of the carrier plate from the exposure apparatus are advantageous for a reliable process of production of the raised structure from solidifiable medium. Inaccuracies in the setting could lead to detachment of the raised structure from the carrier plate and/or, in the case of an arrangement of the exposure apparatus below the reservoir, to adhesions on the reservoir base.

In order to prevent an adhesion of the medium solidified by the UV radiation on the UV-transparent reservoir base, in a further advantageous embodiment a coating of the UV-transparent reservoir base is possible. A specific vertical and/or horizontal relative movement of the carrier plate and the UV-transparent reservoir base is possible in a further preferred embodiment.

In a further preferred embodiment the spacing of the exposure apparatus and the reservoir is variable, as they are arranged so that they can be displaced horizontally and/or vertically with respect to one another. In this way maintenance work is simplified.

Since the raised structure is built up from layers of the initially liquid and solidifiable medium which is located in the reservoir, the (unsolidified) amount of medium in the reservoir reduces with every layer. The setting of the filling level of the reservoir with the solidifiable medium can take place at the beginning. In this case the filling level can be set by hand by means of filling with the medium from canisters for example.

In a preferred embodiment the carrier plate is opaque for UV radiation, so that only solidifiable medium is consolidated by the UV radiation between the exposure apparatus and the carrier plate. Therefore solidifiable medium which is located on the opposite side of the exposure apparatus is not solidified.

In a further preferred embodiment, preferably in the variant with the exposure apparatus below the reservoir, the carrier plate can also be permeable for UV radiation. In this case the solidifiable medium does not surround the carrier plate. In this case the filling level of the reservoir and the position of the carrier plate are chosen here so that the side of the carrier plate opposite the exposure apparatus projects out of the solidifiable medium. For this purpose, after each exposure, or also after a plurality of exposures with the exposure apparatus the filling level of the reservoir with solidifiable medium can be adjusted.

In a further preferred embodiment the thickness of the carrier plate is dimensioned in such a way that no adaptation of the filling level of the solidifiable medium during the entire production of the raised structure of the flexographic printing has to take place, since the side of the carrier plate opposite the exposure apparatus projects out of the solidifiable medium. In a preferred embodiment the reservoir has at least one inlet and also at least one outlet for the solidifiable medium. The solidifiable medium can be introduced into the reservoir via the inlet and can be drained off from the reservoir via the outlet. As a result it is possible that the medium can still be added even during a manufacturing process. This allows very precise control of the quantities so that the production can take place while conserving resources and costs. In this way it is also possible to set a constant filling capacity, or to intentionally reduce or increase the filling capacity. Moreover, for cleaning purposes the solidifiable medium can be emptied from the reservoir via at least one drain. Since the solidifiable medium is light-sensitive, after a production run is ended the medium can also be put into corresponding receptacles which are opaque for UV and light. Alternatively the excess solidifiable medium can also be drawn off from the carrier plate with the raised structure and/or from the reservoir.

In a further preferred embodiment the actuating of the exposure apparatus takes place by means of RIP (Raster Image Processor). In this case data which are used for creation of a graph are transmitted in binary code.

Moreover, the invention relates to a method for the production of flexographic printing forms according to claim 6, wherein a carrier plate on a retaining device is immersed in a reservoir which can be filled with a solidifiable medium and is at least partially irradiated with UV light in freely selectable regions by means of an exposure apparatus. The method comprises a plurality of successive steps:

a immersion of the carrier plate on the retaining device in the reservoir with solidifiable medium;

b adjustment of the thickness of a layer (4) of the solidifiable medium between the carrier plate and the exposure apparatus by a relative movement of the carrier plate and the reservoir;

c exposure of freely selectable regions of the solidifiable medium of the layer between the carrier plate and the exposure apparatus for solidification of the solidifiable medium by means of UV light of the exposure apparatus;

d repetition of the steps b and c for the production of layers of solidified medium to produce a solidified and raised structure from the solidifiable medium on the carrier plate.

e movement of the carrier plate with the produced raised structure out of layers of solidified medium by a relative movement of the reservoir and the carrier plate.

In principle in these steps a solidifiable medium is deposited on a carrier plate. This deposition can take place at certain points or in regions. Thus all types of shapes and patterns can be produced. The said steps build logically on one another and are a preferred embodiment of the invention. However, a different sequence of these steps is possible without departing from the general idea of this invention.

In a first working step the carrier plate is immersed in the reservoir with a solidifiable medium.

In a second step the thickness of a layer of the solidifiable medium between the carrier plate and the exposure apparatus is adjusted by a relative movement of the carrier plate and the reservoir. A defined thickness of the layer is necessary, in order to obtain the required solidification of the medium. In the event of an excessively great layer thickness too much medium is present which cannot be sufficiently solidified by the UV radiation. If the thickness is insufficient, flaws can occur, since because of the viscosity of the solidifiable medium insufficient medium or even no medium at all can flow in. Also, depending upon the embodiment of the apparatus, damage to the carrier plate and/or the reservoir could be brought about by an inaccurate adjustment and a resulting possible contact of the two components.

If the required layer thickness of the solidifiable medium is set, the exposure with UV radiation follows as the next step. The irradiation time is defined in order to ensure a sufficient solidification of the medium. On the other hand an excessively long irradiation time of the medium must also be avoided so that the layers do not cure too much, since otherwise they no longer have the required flexibility of the printing form for flexographic printing for gripping on a roller.

After the irradiation time a raised layer has formed on the carrier plate, or in repetitions a further layer has formed on the preceding layer. Thus the adjustment of the required layer thickness should be repeated until the required raised structure is achieved. In this case the spacing of the carrier plate relative to the exposure apparatus must be increased by the height of a layer thickness, so that the solidifiable medium can flow in and a new layer to be solidified can form before a novel exposure can take place.

If the required thickness of the raised structure is achieved by repeating the said steps, the carrier plate with the adhered solidified raised structure, consisting of at least one layer, preferably a plurality of layers of solidified medium, is lifted or moved out of the reservoir. In this case it is not only conceivable that the carrier plate moves out of the reservoir, but a movement of the reservoir is likewise possible. Also the combination of moving the reservoir and moving the carrier plate relative to one another is conceivable.

Further steps of the method are f irradiating the produced raised structure with UV-A and/or UV-C radiation;

g separating the produced raised structure, which has solidified in layers, from the carrier plate, wherein the step f can also take place after the step g.

The raised structure of the solidifiable medium is indeed solidified after the production, but has a sticky surface. With the aid of a further irradiation with UV-A for solidifying and/or with UV-C for detackifying the surface it is possible to achieve a targeted further solidification of the printing form, until the required flexibility is obtained.

In a preferred embodiment a treatment with UV-A radiation for solidifying takes place first.

Then a further curing with UV-C radiation follows for detackifying the surface of the printing form. After this working step the produced printing form, consisting of the raised structure, can be released from the carrier plate.

In a further preferred embodiment the irradiation with UV-A radiation for solidification takes place first of all; then the printing form is released from the carrier plate and then exposed to UV-C radiation for detackifying. In principle the sequence of the steps of irradiation with UV-A radiation and UV-C radiation and the release can take place in different orders. Repeated irradiation with UV-A and UV-C radiation is also conceivable before and/or after to the release of the printing form from the carrier plate.

The UV radiation for solidifying the raised structure is in the same range as the UV radiation for solidifying the individual layers of the solidifiable medium to build up the raised structure. Thus it is in the wavelength range of UV-A radiation. The wavelength range is from 300 nm to 410 nm, preferably 320 nm to 400 nm, particularly preferably 340 nm to 380 nm.

For detackifying the raised structure, UV-C radiation is preferably used in a wavelength range from 90 nm to 300 nm, preferably 100 nm to 280 nm, particularly preferably 150 nm to 240 nm. As a result a solidified, non-tacky surface structure is achieved, which is beneficial for the later use of the raised structure as a printing form.

Preferably the raised structure is still flexible even after the preceding operations in which UV radiation of different wavelengths is used. The flexibility of the flexographic printing and the surface quality is in fact influenced by the UV radiation so that they it has a positive effect on the wear and the print quality during printing. Thus the printing plate is solidified so that it is robust against wear during printing. However, it is also so flexible that it can be gripped on a printing roller.

The treatment of the printing plate with UV-A radiation for solidifying and/or UV-C radiation for detackifying is preferably carried out with a homogeneous exposure.

According to a further preferred embodiment of the method, the buildup of layers takes place on a flexible base material which is arranged on the carrier plate and/or the base material has a flexible support structure on which the layers of solidifiable medium are deposited. The base material can be produced by a plurality of layers of the exposed solidifiable medium.

In another preferred method of production a base material is already fastened to the carrier plate before the process of exposure, in order then to be immersed in the reservoir with solidifiable medium, so that it is possible to start directly with building up the raised structure or patterns. Thus after the production this base material is connected to the built-up raised structure and thus is part of the printing form.

In a preferred embodiment a base material is deposited, in which a flexible support structure is incorporated. This support structure prevents a lengthening of the later printing form and prevents or limits distortion thereof. This structure is also preferably used in order to prevent release of the raised structure from the carrier plate.

In a preferred embodiment the base material and/or the support structure can have a different strength from the deposited raised structure. Thus a tough and therefore low-wear printing surface can be combined with a soft base material and/or support structure which can easily be fastened and to a flexographic printing roller. Moreover, as a result, by comparison with a flexographic printing plate consisting of only one single material with the same strength throughout, the flexographic printing plate can also be produced using less material.

In a further advantageous embodiment only the support structure is deposited on the carrier plate and then the buildup of the first layers is started. For a better integration of the support structure, in a further advantageous embodiment first of all at least one layer of the solidifiable medium can be built up on the carrier plate, then the support structure can be introduced and then the solidification of further layers is continued. In a further preferred embodiment the flexible support structure can consist of a film or a mesh. The support structure advantageously consists of polyester, polyacrylic or even of natural fibres.

In a preferred embodiment the formats of the printing form including the size of the carrier plate in length and width can be freely chosen. Moreover, the due to the additive manufacture the printing plates have a low height or plate thickness. The height of the printing plate can be in a range from 0.4 mm to 10 mm, preferably 0.5 mm to 7 mm and particularly preferably from 0.76 mm to 6.35 mm.

BRIEF DESCRIPTION OF THE DRAWINGS

FIG. 4: schematic representation of an image with edge trimming and stacking.

DETAILED DESCRIPTION OF THE
INVENTION

Figure 1:
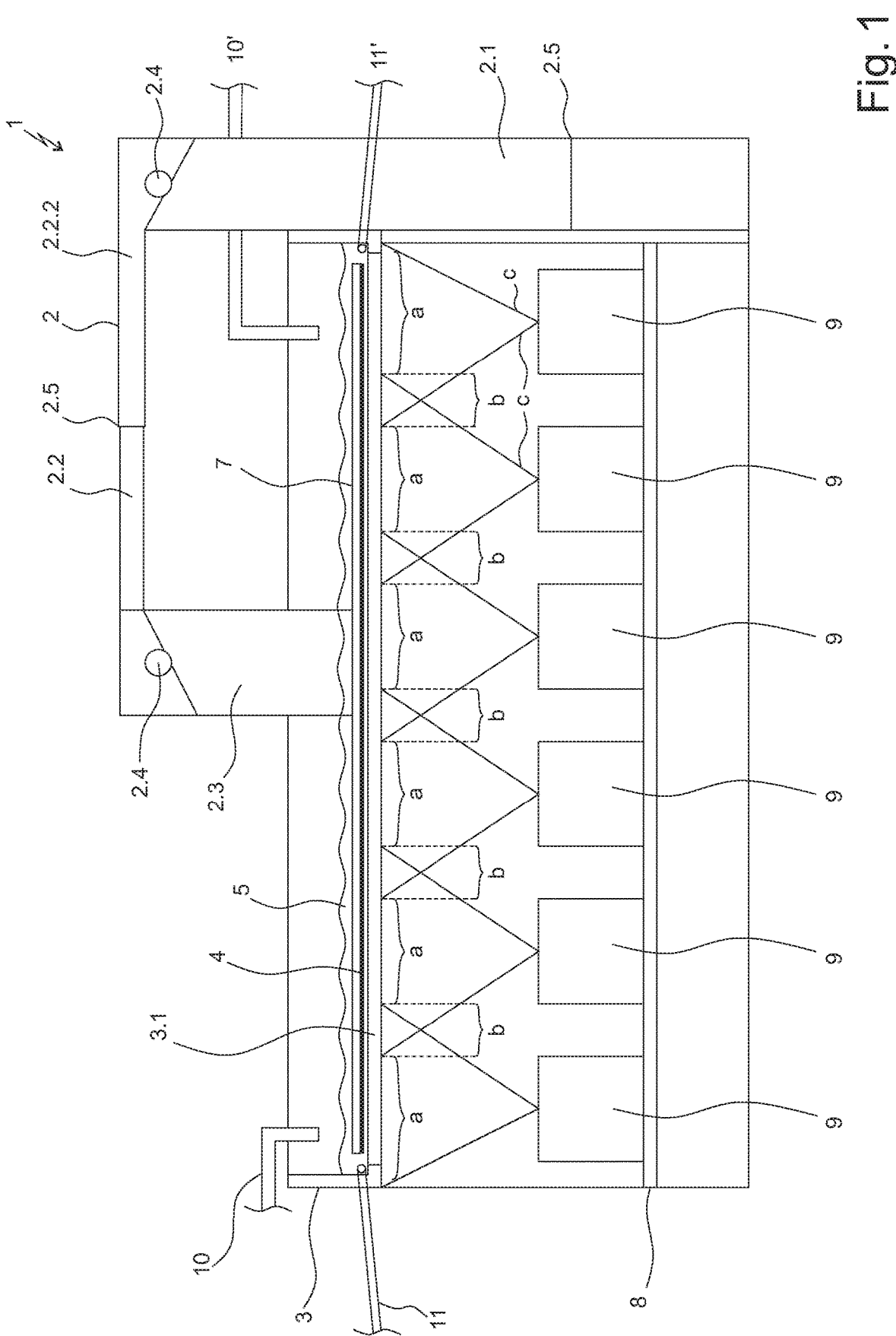
FIG. 1: schematic structure of an apparatus for producing flexographic printing forms in a two-dimensional view.

FIG. 1 shows by way of example the schematic construction of an apparatus 1 for producing flexographic printing forms. The principal components of the apparatus are the reservoir 3, the exposure device 8 and a retaining device 2 to which a carrier plate 7 is attached. The reservoir 3 has a base 3.1 which is transparent for UV radiation. Thus by means of the exposure device 8 the reservoir 3 can be exposed from below and the solidifiable medium 5 located therein can be irradiated, so that a layer of solidified medium 4 is produced between the reservoir base 3.1 and the carrier plate 7 by exposure by the exposure device 8. The exposure device 8 consists of a plurality of projectors 9 which are arranged so that they illuminate the UV-transparent reservoir base 3.1. The number of six projectors 9 is selected by way of example, any other number is also possible. In this case the projectors 9 are arranged with their beam cone c in such a way that each projector 9 exposes a region a by itself and exposes a region b overlapping with a further adjacent projector 9. Thus in the overlapping region b an intersection of edges takes place by stacking of individual images. As a result it is possible to expose large regions with UV radiation with a fine resolution with a high level of detail. In this case there are no edges between the individual images which could affect the quality. Thus there is no balance between the size of the surface area to be irradiated and the accuracy or resolution. The resolution is in a range from 2000 dpi to 10100 dpi, preferably in a range from 2400 dpi to 10000 dpi and particularly preferably in a range from 3000 dpi to 9500 dpi.

The reservoir 3 has a UV-transparent base 3.1 and is intended for filling with a solidifiable medium 5. The reservoir 3 is filled with the solidifiable medium 5 via at least one inlet 10, in this example two inlets 10, 10'. For cleaning purposes or, since the medium 5 is light-sensitive, after the production of a printing form, that is to say a raised structure 6, the medium can be drained off again via an outlet 11, or outlets 11 and 11'. In this way handling of the medium 5 is achieved in a way which conserves resources. Moreover, filling and emptying of the reservoir 3 in a targeted manner are also possible during production. The filling level can be controlled or adjusted by this device consisting of an inlet and outlet 10, 11.

The carrier plate 7 is fastened to a retaining device 2. In this way it is possible to set the distance from the carrier plate 7 to the UV-transparent reservoir base 3.1. By this means it is determined how thick the layer of solidifiable medium 4 is which is built up during exposure. The carrier plate 7 is advantageously attached so that it can not only be precisely positioned but is also easily accessible for maintenance and replacement work. In this exemplary embodiment it is therefore attached to a retaining device 2 which consists of a stand 2.1 and a horizontal arm 2.2. In order to be able to move the carrier plate 7, moving devices 2.5, which allow displacement of the carrier plate 7 in the horizontal and/or vertical direction, are located in the stand 2.1 and/or in the horizontal arm 2.2. Moreover, are swivel joints are provided 2.4 between the stand 2.1 and the horizontal arm 2.2, as well as between the horizontal arm 2.2 and the vertical arm 2.3, and are preferably mounted rotatably in all spatial directions in order to allow precise alignment of the carrier plate 7 with the reservoir base 3.1. Furthermore, these devices can be used in order to lift and to rotate the carrier plate 7 so that work on this is as user-friendly as possible. Thus for removal of a produced printing form the carrier plate 7 can be raised and moved laterally and/or inclined so that it is easily visible to the worker.

Due to the exposure with UV radiation by the exposure apparatus 8 the exposed regions 12 of the solidifiable medium 5 are consolidated. In this case the exposed regions 12 can have patterns, images and shapes of all kinds, so that layers of solidified medium 4 are produced.

The structure of the apparatus 1 is preferably housed in a closed compartment which is opaque to UV radiation and light, since the solidifiable medium 5 is light-sensitive and the UV radiation can be harmful to the health of the user.

Figure 2:
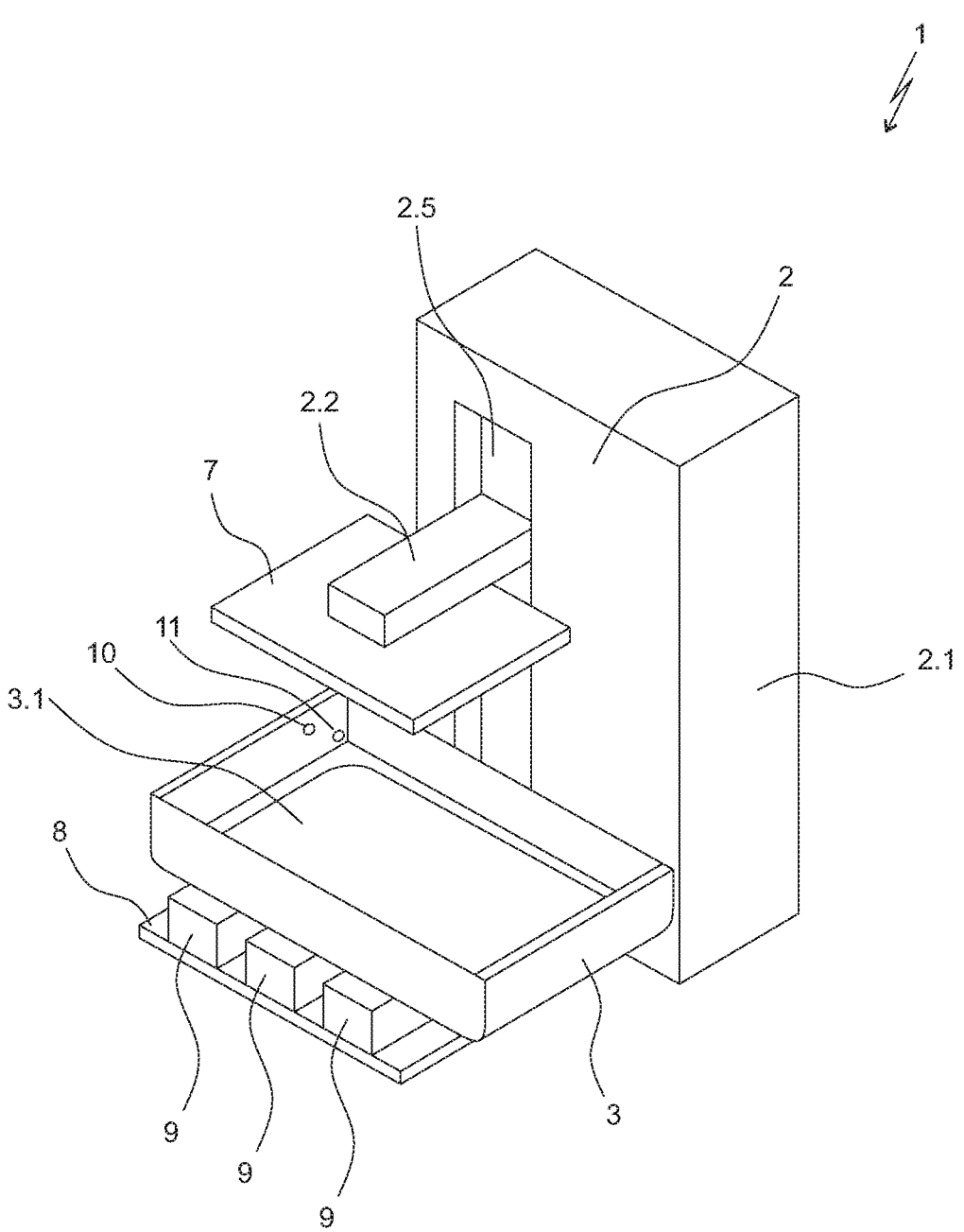
FIG. 2: schematic structure of an apparatus for producing flexographic printing forms in a three-dimensional view.

FIG. 2 shows by way of example the schematic structure of an apparatus 1 for producing flexographic printing forms in a three-dimensional view. A carrier plate 7 is attached to a retaining device 2 which consists of a stand 2.1 and a horizontal arm 2.2. With the aid of the retaining device 2 the carrier plate can be lowered into the reservoir 3 and exact positioning in relation to the UV-transparent reservoir base 3.1 can be achieved.

In this embodiment of the apparatus 1 the exposure apparatus 8 consists of projectors 9 which are arranged so that they can project a consistent image onto the UV-transparent reservoir base 3.1 by overlapping of edges and stacking. With such an arrangement the projection of a detailed pattern or image in high resolution is possible, and it is even possible to manufacture punctiform, finely resolved patterns and shapes.

With the apparatus 1 for this mode of operation the size of the printing plates to be manufactured can be freely selected up to the to maximum size of the carrier plate 7. Smaller formats can be produced, in which case the outer regions of the carrier plate 7 are not irradiated with UV light. Moreover, the printing plates can be constructed by additive manufacture with quite a low height.

The inlet 10 and outlet 11 of the solidifiable medium 5 are preferably attached in a corner of the reservoir 3. As a result the filling capacity of the solidifiable medium 5 can be adjusted. In order to protect the apparatus from an external incidence of light, it can be accommodated in a housing which is opaque for UV radiation and light.

Figure 3:
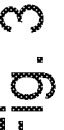
FIG. 3: schematic structure of an apparatus for producing flexographic printing forms in a two-dimensional view.

FIG. 3 shows by way of example the schematic construction of an apparatus 1 for producing flexographic printing forms in which the exposure apparatus 8 is arranged above the reservoir 3. In this arrangement the exposure apparatus 8 with the projectors 9 radiates down onto the reservoir 3 with the carrier plate 7. In the reservoir 3 the carrier plate 7 is attached to a retaining device 2. Moving devices 2.5 which allow a vertical displacement of the carrier plate 7 are integrated in the retaining device 2. On the carrier plate 7 layers of solidified medium 4 are solidified by the exposure with the exposure apparatus 8. By subsequent movement of the carrier plate 7 vertically in the direction of the reservoir base and flowing in of the solidifiable medium 4, and then a repeated exposure, a raised structure 6 is built up layer 4 by layer 4. All the features which are disclosed in connection with the embodiment, in which the exposure apparatus 8 is arranged below the reservoir 3, can also be combined with the arrangement of the exposure apparatus 8 above the reservoir 3, in particular swivel joints 2.4, reservoir 3, carrier plate 7, exposure apparatus 8 with projectors 9, inlet 10 and outlet 11 for the monomeric medium.

FIG. 4 shows by way of example the schematic representation of an image with edge trimming and stacking. In this exemplary representation a large contiguous image is generated by edge trimming and stacking of three images, without edges being produced between the individual images. Thus the regions a are only each exposed by one projector 9, whilst the regions b each have an overlap of 2 images from two projectors 9. In order to achieve this, for example the right-hand edge of the left-hand picture and the left-hand edge of the subsequent right-hand image must be the same. Otherwise there would be a false representation of the overall image. With the aid of this technology it is possible to expose a large surface area with high resolution.

Figure 5:
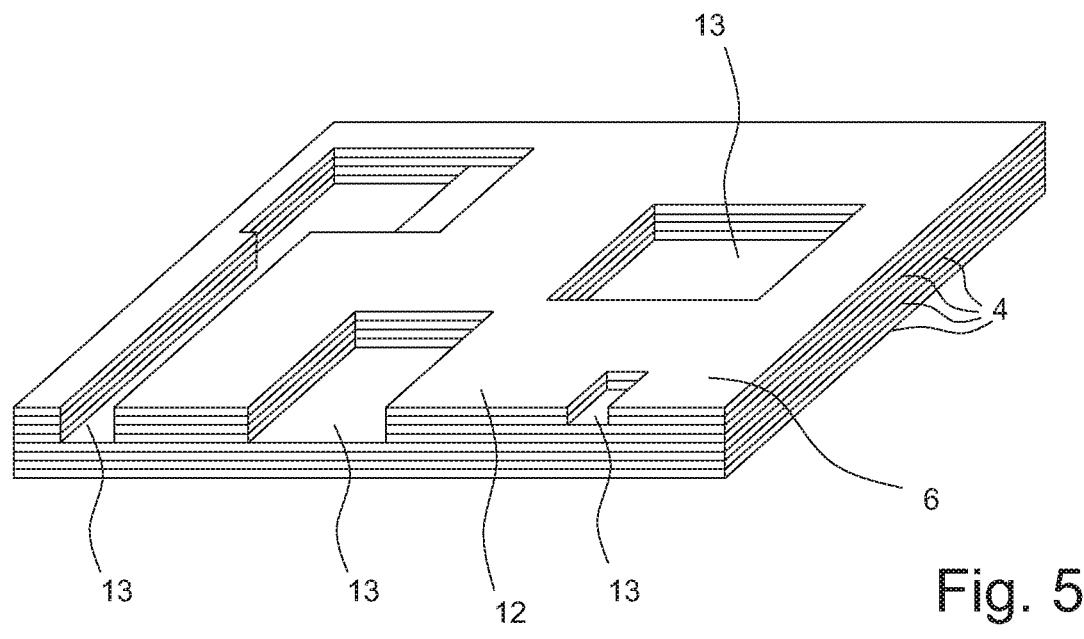
FIG. 5: schematic representation of a flexographic printing plate.

FIG. 5 shows by way of example the schematic representation of a flexographic printing plate. The printing plate is the raised structure 6, which consists of at least one layer 4, usually a plurality of layers, of solidified medium 4. As already described, these individual layers 4 are produced by exposure of solidifiable medium 5 with UV radiation. The solidifiable medium 5 is solidified only in the exposed regions 12. Thus any type of patterns, images or shapes can be projected by unexposed regions 13. The image and thus also the unexposed regions 13 can be varied from layer 4 to layer 4. Thus it is possible to produce deeper and also shallower patterns.

Figure 6:
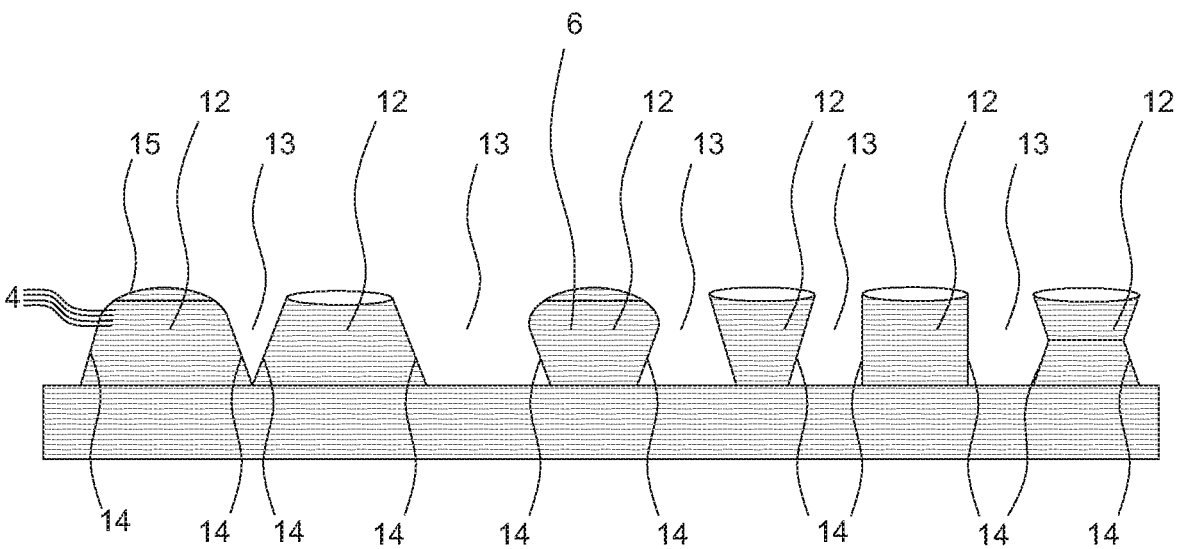
FIG. 6: Schematic representation of a flexographic printing plate.

FIG. 6 shows by way of example the schematic representation of a flexographic printing plate. The flexographic printing consists of a plurality of layers 4 of solidifiable medium. In this case the raised structure 6 can be configured as required. Thus for example sides 14 of the raised structure are possible in different embodiments. These can extend in a straight line or obliquely or can also have concave or convex contours. Also the shape of a truncated cone or of an inverted truncated cone is possible; the combination of truncated cone and inverted truncated cone is likewise possible. Also the printing surface 15 can be flat, rounded and/or concave or convex. Each thinner the layer thickness 4 is chosen to be in these regions, the more precisely the rounding and/or a radius can be represented. This shaping of the sides 14 and printing surfaces 15 is made possible by minimally different images/shapes during the exposure of the exposed region 12 from layer 4 to layer 4 during the production of the raised structure 6.

Figure 7:
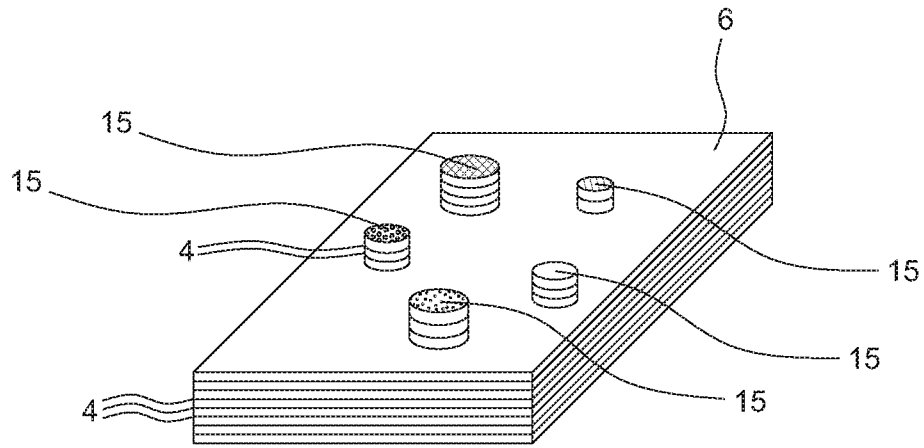
FIG. 7: schematic representation of a flexographic printing plate with different surface structures.

FIG. 7 shows the schematic representation of a flexographic printing plate with different surface structures. A desired surface structure of the printing surface 15 can be produced by the last layer or the last layers 4 of the solidified medium. Thus not only smooth surfaces can be seen, but also localised indentations or protuberances. A possible embodiment is also a fine grooved structure, likewise a crossed grooved structure. These optimised surface structures serve to take up the printing ink in the best possible manner and to dispense it again and/or to store a certain quantity of printing ink in order to obtain homogeneous printing.

Figure 8A:
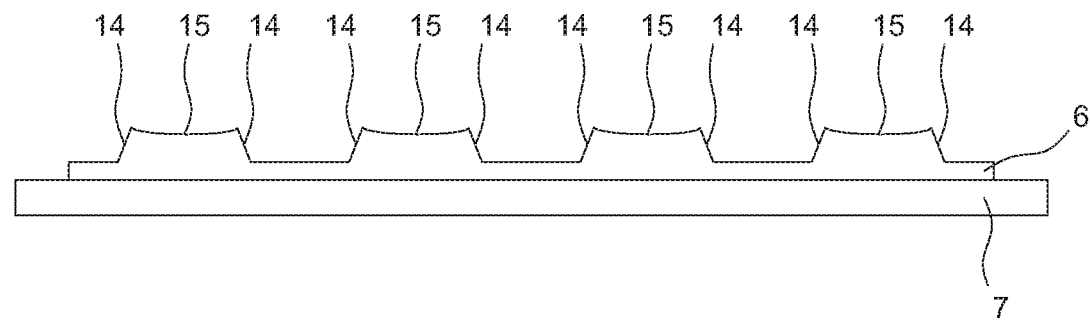
FIG. 8a: schematic representation of a flexographic printing plate in a flat position.
Figure 8B:
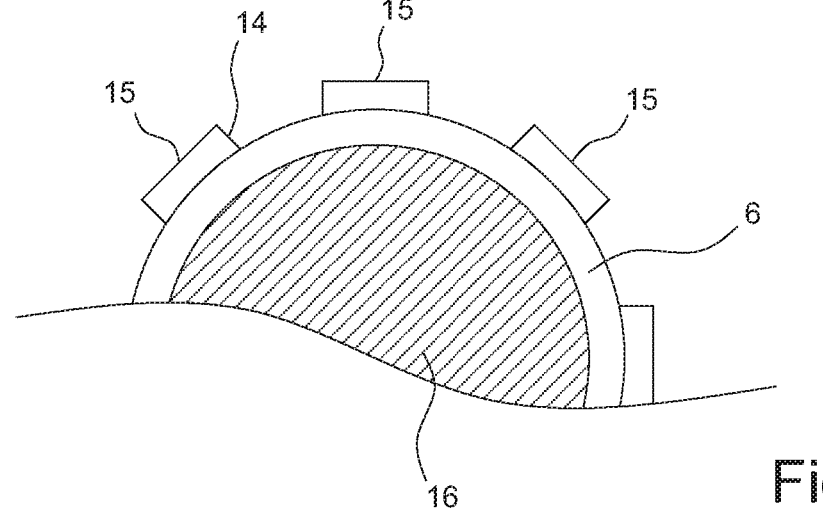
FIG. 8b: schematic representation of a flexographic printing plate gripped on a roller.

FIG. 8*a* shows the schematic representation of a flexographic printing plate in a flat position and FIG. 8*b* shows the flexographic printing plate gripped on a roll 16. In the production of the flexographic printing plate or of the raised structure 6, this is located on the carrier plate 7. This is flat, or without curvature. For the flexographic printing method the printing plate is gripped on a flexographic printing roller 16. The raised structure 6 is curved by the roller shape. In this way the raised structure 6 is slightly deformed, or curved. This can be taken into consideration during the production of the raised structure 6. The printing surface 15 and the sides 14 are configured in such a way that in a flat position they have an oblique side 14 and a concave printing surface 15. This corrects the deformation of the surface of the raised structure 6, which takes place by gripping on a flexographic printing roller 16. As a result, in the gripped state an exactly flat printing surface 15 of the raised structure 6 and a clean edge with no rounding or only a very slight rounding to the lateral surface 14 is possible. Also, in the gripped state the side surface 14 is perpendicular, or in the preferred shape. Regardless of the required shape of the side 14 and the printing surface 15, taking into consideration the change to the raised structure 6 by the gripping on a flexographic printing roller 16 is possible and can be configured so that in the gripped state it corresponds to the target shape.

Figure 9:
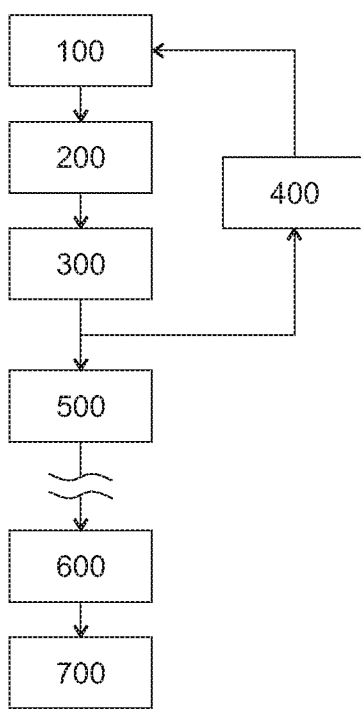
FIG. 9: time schedule of a printing process.

FIG. 9 describes by way of example the time schedule of a flexographic printing method. In this case in a first step 100 the carrier plate 7 is immersed in the reservoir 3 with solidifiable medium 5. In the next step 200 the thickness of a layer 4 of the solidifiable medium 5 between the carrier plate 7 and the exposure apparatus 8 is adjusted by a relative movement of the carrier plate 7 and the reservoir 3. Following this is the step 300 of exposure of freely selectable regions of the solidifiable medium 5 between the carrier plate 7 and the exposure apparatus 8 for solidifying this solidifiable medium 5 by means of UV radiation from the exposure apparatus 8 in the exposed regions 12. This is followed by the step 400 of repetition of the steps 200 and 300 for the production of layers of solidified medium 4 to produce a solidified and raised structure 6 from the solidifiable medium 5 on the carrier plate 7. This step 400 is repeated until the required thickness, shape and structure of the raised structure 6 is achieved.

Then, when the required thickness of the raised structure 6 is achieved, the step 500 takes place, the movement of the carrier plate 7 with the produced raised structure 6 out of layers of solidified medium 4 by a relative movement of the reservoir 3 and the carrier plate 7.

Following this manufacture of the raised structure 6, that is to say the printing plate, for further improvement of the plate characteristics there follows a step 600, in order to detackify the surface by means of UV-C radiation and/or to solidify the flexographic printing plate by means of UV-A radiation.

In the last step 700 the produced solidified and raised structure 6 is released from the carrier plate 7. Depending upon the embodiment of the apparatus 1, first of all the step 700 can also take place, and the step 600 can then be carried out on another machine. It is also conceivable that the raised structure 6 together with the carrier plate 7 is removed from the apparatus 1 and then the step 600 takes place on another apparatus, wherein the carrier plate 7 is gripped in the other apparatus. Thus the carrier plate 7 serves not only to build up the layers 4, but also as a protective layer, so long as the solidified structure 5 has not yet acquired its required final state with respect to solidification and surface quality/detackifying of the surface.

LIST OF REFERENCES

1 apparatus
2 retaining device
2.1 stand
2.2 horizontal arm
2.3 vertical arm
2.4 swivel joint horizontal and/or vertical
2.5 moving device
3 reservoir
3.1 UV-transparent reservoir base
4 layer of solidified medium
5 solidifiable material
6 raised structure
7 carrier plate
8 exposure apparatus
9 projector
10 inlet for the monomeric or polymeric medium
10' inlet for the monomeric or polymeric medium
11 outlet for the monomeric or polymeric medium
11 outlet for the monomeric or polymeric medium 12 exposed regions
13 unexposed regions
14 side of the raised structure
15 printing surface of the raised structure
16 flexographic printing roller
a individual region
b overlapping region
c beam cone
100 immersion
200 adjustment of layer thickness
300 exposure
400 repetition
500 movement outwards
600 irradiation
700 separation

The invention claimed is:

1. An apparatus for producing printing forms for flexographic printing, comprising a carrier plate and a retaining device on which the carrier plate is arranged, a reservoir and an exposure apparatus, wherein the reservoir is configured to be filled with a solidifiable medium and the carrier plate is configured for immersion in the solidifiable medium and the exposure apparatus is configured to radiate UV radiation in patterns, images or other shapes onto the solidifiable medium, wherein the carrier plate and the exposure apparatus are arranged so that at least one layer of the solidifiable medium can be exposed between a main side of the carrier plate and the exposure apparatus with UV radiation and can be solidified on the carrier plate, wherein the carrier plate is adjustable in the reservoir and a layer thickness of a layer of the solidifiable medium between the carrier plate and the exposure apparatus is adjustable by a relative movement of the carrier plate and the reservoir, wherein the exposure apparatus comprises at least two projectors, which are configured to project an image in such a way that a contiguous image is produced by edge trimming and stacking of a plurality of images, and wherein the projectors are arranged with their respective beam cones in such a way that each projector exposes a region by itself and exposes a region overlapping with a further adjacent projector.

2. The apparatus according to claim 1, wherein the exposure apparatus is arranged above or below the reservoir, wherein the reservoir has a UV-transparent reservoir base when the exposure apparatus is arranged below the reservoir.

3. The apparatus according to claim 1, wherein the thickness of a layer of solidified medium can be adjusted, in a range from 0.01 mm to 3 mm, in a range from 0.02 mm to 2 mm, or in a range from 0.025 mm to 1.5 mm.

4. The apparatus according to claim 1, wherein the retaining device is configured to move the carrier plate with the aid of a moving device in a vertical and/or horizontal direction and to hold the carrier plate in a defined position.

5. A method for the production of flexographic printing forms, wherein a carrier plate on a retaining device is immersed in a reservoir which can be filled with a solidifiable medium and is at least partially irradiated with UV light in freely selectable regions by an exposure apparatus, wherein the exposure apparatus comprises at least two projectors, which are configured to project an image in such a way that a contiguous image is produced by edge trimming and stacking of a plurality of images, comprising the following steps:

a immersion of the carrier plate on the retaining device in the reservoir with solidifiable medium;

b adjustment of the thickness of a layer of the solidifiable medium between the carrier plate and the exposure apparatus by a relative movement of the carrier plate and the reservoir;

c exposure of freely selectable regions of the solidifiable medium of the layer between the carrier plate and the exposure apparatus for solidification of the solidifiable medium by UV light of the exposure apparatus, wherein the projectors are arranged with their respective beam cones in such a way that each projector exposes a region by itself and exposes a region overlapping with a further adjacent projector;

d repetition of the steps b and c for the production of layers of solidified medium to produce a solidified and raised structure from the solidifiable medium on the carrier plate; and e movement of the carrier plate with the produced raised structure out of layers of solidified medium by a relative movement of the reservoir and the carrier plate.

6. The method according to claim 5, with the further steps
f irradiation of the produced raised structure with UV-A and/or UV-C radiation; and
g separation of the produced raised structure, which has solidified in layers, from the carrier plate,
wherein the step f can also take place after the step g.

7. The method according to claim 5, wherein the solidifiable medium is solidified in method step c by UV-A radiation in a wavelength range from 300 nm to 410 nm, 320 nm to 400 nm, or 340 nm to 380 nm.

8. The method according to claim 6, wherein the solidifiable medium is furthered solidified in the method step f by UV-C radiation in a wavelength range from 90 nm to 300 nm, 100 nm to 280 nm, or 150 nm to 240 nm, and the surface is detackified, wherein the raised structure is still flexible after the action of UV radiation.

9. The method according to claim 5, wherein the buildup of layers takes place on a flexible base material which is arranged on the carrier plate and/or the base material on which the layers of solidifiable medium are deposited has a flexible support structure.

10. The apparatus according to claim 2, wherein the exposure apparatus comprises at least two projectors, which are configured to project an image in such a way that a contiguous image is produced by edge trimming and stacking of a plurality of images.

11. The apparatus according to claim 2, wherein the thickness of a layer of solidified medium can be adjusted, in a range from 0.01 mm to 3 mm, in a range from 0.02 mm to 2 mm, or in a range from 0.025 mm to 1.5 mm.

12. The apparatus according to claim 2, wherein the retaining device is configured to move the carrier plate with the aid of a moving device in the vertical and/or horizontal direction and to hold the carrier plate in a defined position.

13. The method according to claim 6, wherein the solidifiable medium is solidified in the method step c by UV-A radiation in a wavelength range from 300 nm to 410 nm, 320 nm to 400 nm, or 340 nm to 380 nm.

14. The method according to claim 6, wherein the buildup of layers takes place on a flexible base material which is arranged on the carrier plate and/or the base material on which the layers of solidifiable medium are deposited has a flexible support structure.

15. The method according to claim 7, wherein the buildup of layers takes place on a flexible base material which is arranged on the carrier plate and/or the base material on which the layers of solidifiable medium are deposited has a flexible support structure.

16. The method according to claim 8, wherein the buildup of layers takes place on a flexible base material which is arranged on the carrier plate and/or the base material on which the layers of solidifiable medium are deposited has a flexible support structure.

17. The method according to claim 13, wherein the buildup of layers takes place on a flexible base material which is arranged on the carrier plate and/or the base material on which the layers of solidifiable medium are deposited has a flexible support structure.

\* \* \* \* \*